Sept. 11, 1928.                                                          1,684,216
               W. J. DONOVAN
              ENGRAVING MACHINE
             Filed Oct. 27, 1924
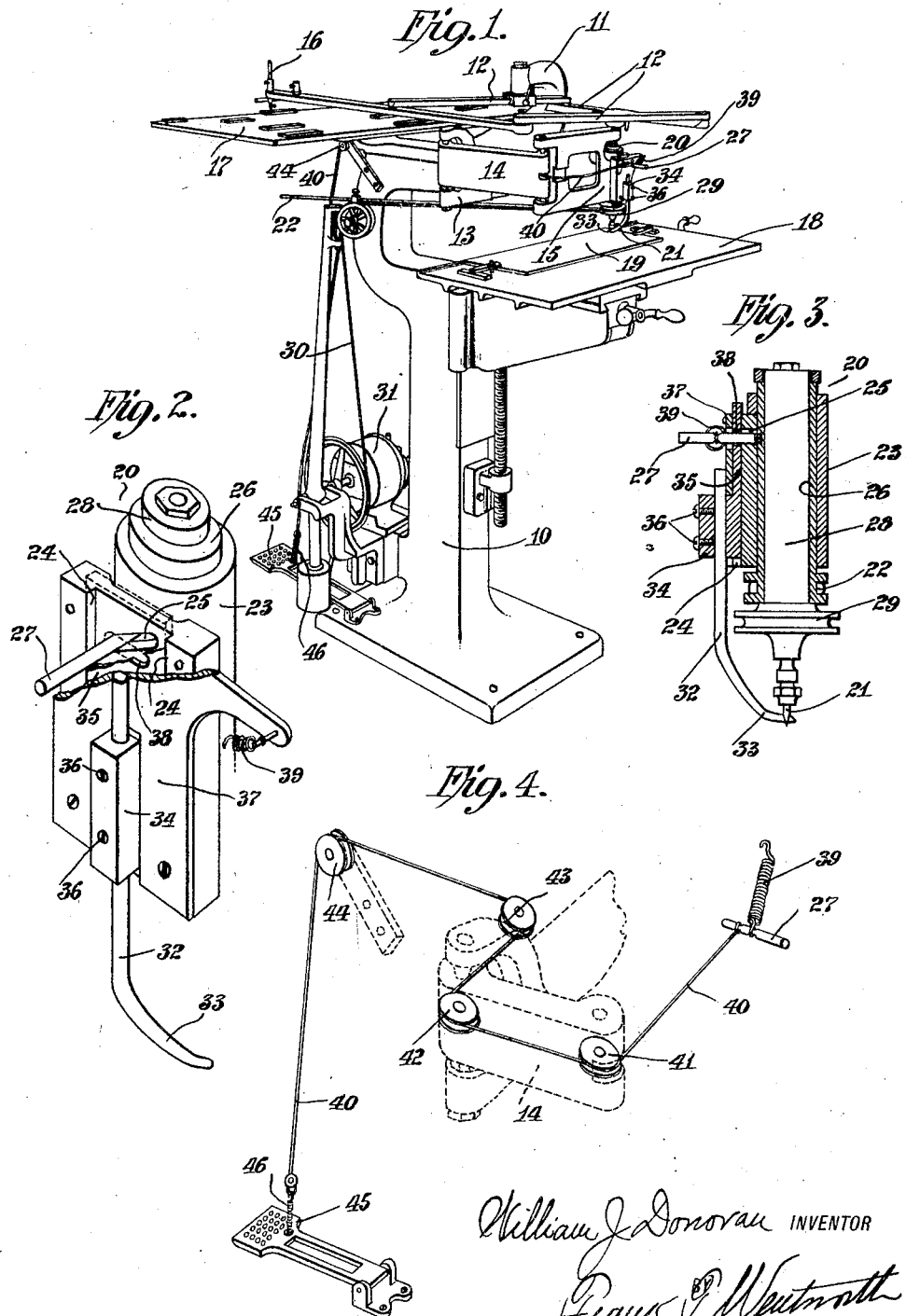

Patented Sept. 11, 1928.

1,684,216

UNITED STATES PATENT OFFICE.

WILLIAM J. DONOVAN, OF SAG HARBOR, NEW YORK, ASSIGNOR TO ENGRAVERS & PRINTERS MACHINERY COMPANY, INC., OF SAG HARBOR, NEW YORK, A CORPORATION OF NEW YORK.

ENGRAVING MACHINE.

Application filed October 27, 1924. Serial No. 746,031.

My invention relates to engraving machines, and more particularly to a pantographic engraving machine adapted for use in cutting letters, numbers or other insignia upon panel boards or similar sheets ordinarily made of hard, vulcanized rubber, bakelite or similar pressed or molded material.

Pantographic engraving machines are, and have been, extensively used in the production of copper and steel printing plates and dies, but when such machines have been used in the laying out of data upon vulcanized or bakelite panel boards, it has been found that the ordinary mechanisms for ensuring substantial uniformity in the depth of the cut of the routing tool or graver do not give entirely satisfactory results.

In machines used for the production of printing plates, the surface upon which the router or graver works is perfectly smooth and flat, special care being taken to secure this condition since such is essential to the marking of imprints from such plates. Consequently owing to the nature of the work with such machines, it has been possible to employ a micrometer screw setting mechanism to limit the degree of penetration of the router or graver in its action upon the plate, thus ensuring uniformity in the depth of all cuts upon the plate, with the same setting of the micrometer screw, owing to the true, flat surface of the work plate. In all such machines the depth of cut is limited to a few thousandths of an inch, and the engagement of any mechanism with the surface of the plate except the router or graver has been avoided because in printing work any scratches on the surface of the work plate, however slight, will appear as blemishes in the imprint.

When routing or engraving designs upon vulcanite, bakelite or similar substances in sheet form, it has been found that the surface of such sheets or plates is not even approximately flat, and very much out of true at different portions thereof. In work upon such plates the depth of cut may be, and ordinarily is greater than in the production of printing plates, but nevertheless the surface irregularities in such sheets or plates may sometimes be as great or greater than the depth of cut to be taken, so that with the old micrometer screw method of setting, the variation in the depth of cut throughout different portions of the plate is apt to be so great as to be noticeable. If a micrometer screw be set for the highest point on such a plate, there may be portions in which the router or graver will not engage the plate at all, while if such a screw be set in relation to the lowest point of the plate then the depth and width of the lines in different portions of the plate will vary to an appreciable extent being much deeper and wider at every high point than at the low points. This condition arises from the fact that the shape of the router or graver, as to its working point, is such as to cut from the sides, the point being in triangular form so that the greater the penetration of the point, the wider will be the line. This condition results in noticeable irregularity in the work produced.

With the above conditions in mind, I provide a work head or support for the routing tool or graver, which is so constructed that the degree or extent of penetration of the routing tool, or graver, will be limited with regard to the surface of the sheet or plate upon which the tool acts as distinguished from a mechanism forming in its entirety a part of the machine, thus securing substantial uniformity in the depth of cut at all points of a plate, irrespective of surface irregularities therein. This result is accomplished by means of a stop carried by and movable with the work head, and positioned closely adjacent the point upon which the tool is working, so as to limit the downward movement of the work head and tool by engagement with the surface of the sheet or plate. The surface variations in the sheet or panel need not be taken into account when setting the machine for depth of cut since such variations will be automatically compensated for during the ordinary working of the machine, and require no attention whatever from the operator.

By making this stop member adjustable upon the head, and in relation to the point of the router or graver, I may set the machine for any desired depth of cut, and this depth will be uniform irrespective of high or low parts of the sheet or plate which is to be engraved.

When employing a stop of the character above referred to, it is essential to provide an actuating mechanism for the work head which will automatically adjust itself to varying degrees of downward movement of the head, it being possible that such variation may occur during the making of different portions of even a short line. Furthermore, this actuating mechanism is so constructed as to accommodate it to different settings of the stop member for different depths of cuts, and as to always develop substantially the same pressure irrespective of the degree of movement of the work head as determined by the stop member engaging different portions of an irregular surface of a sheet or plate. Furthermore, this actuating mechanism is so constructed and arranged as to avoid any possible distortion in the reproduction due to stresses upon the lever system of the pantograph.

The invention consists primarily in an engraving machine embodying therein a pantographic lever system, a work head actuated thereby, a tracing stylus carried by said lever system, a pattern support in operative relation to said stylus, a work table in operative relation to said work head, a tool carried by said work head, means having a normal tendency to move said work head from, and maintain it out of, the operative relation to work upon said work table, means whereby said work head may be moved toward said work table, a stop member projecting towards said tool to a position closely adjacent and above the working point thereof, whereby downward movement of said work head will be arrested by engagement of said stop member with a plate or sheet upon said work table, and thus ensure uniformity in the depth of cut made by said tool irrespective of surface irregularities in a plate or sheet upon said work table and means operative upon said stop member and acted upon both by the means for moving the work head toward and the means for moving the work head from said work table whereby said work head and said stop member will be simultaneously actuated through the same mechanism and to the same extent; and in such other novel features of construction and combination of parts as are hereinafter set forth and described, and more particularly pointed out in the claims hereto appended.

Referring to the drawings,

Fig. 1 is a perspective view of an engraving machine embodying my invention;

Fig. 2 is a perspective view of a portion of the work head and its supporting member of the pantographic lever system, with the stop member and the slide carrying same, shown in dotted line;

Fig. 3 is a cross-sectional view of the work head and its support; and

Fig. 4 is a detail perspective view of the actuating mechanism operative to move the work head toward and from a plate or sheet upon the work support.

Like numerals refer to like parts throughout the several views.

In the embodiment of the invention shown in the drawings, the main standard of the machine is shown at 10, this standard having a gooseneck 11 forming the main pivotal support for the pantographic lever system 12. Also supported by said standard is a forked arm 13 in which is pivoted a lever 14 having oscillatory movement laterally of the machine, and a second lever 15 pivoted thereto and having oscillatory movement fore and aft of the machine, this last named lever being connected with the lever system 12. Both levers 14 and 15 have movement upon a horizontal plane only.

Carried by one of the levers of the pantographic lever system 12 is a tracing stylus 16 in operative relation to which is a pattern support 17. Adjustably supported upon the standard 10 is a work table 18 in operative relation to a work head to be more fully described hereinafter, adapted to receive a plate or sheet, shown at 19 in the drawings. This plate or sheet is formed of vulcanite, bakelite or other similar material susceptible of having surface irregularities therein of the character above referred to.

Carried by the lever 15 is a work head, indicated at 20, Fig. 1, which in the form of the invention shown has a rotatable spindle carrying a routing tool or graver 21. Broadly considered, the parts heretofore described are old and well known in the pantographic engraving machine art, my invention relating more particularly to the details of construction of the work head and the actuating mechanism therefor.

While I have referred to the levers 14 and 15 as having oscillatory movement in certain directions, it will be understood that movement of the lever 15 laterally of the machine is permitted by the lever 14 which acts merely as a support for the lever 15, to permit such lateral movement; a combined lateral and fore and aft movement, or merely a fore and aft movement thereof, so as to permit the cutting of curved or irregular lines; or straight lines, either laterally or fore and aft of the machine, or obliquely to either of these directions, as required.

Acting upon the spindle of the work head and the pulleys for the belt 30 is a radius rod 22.

The pattern support 17, and the work table 18 are provided with the usual clamps and adjustment mechanism for locating the pattern and the work plate with relation to the stylus and the work head.

Upon the lever 15 is a vertically extending bearing sleeve 23 having formed thereon vertically extending tracks, or vertically extending slideways 24, said sleeve and said slideways having extending therethrough an inclined, or cam, slot 25.

Rotatably and slidably mounted in the sleeve 23 is a bearing bushing 26 to which is secured a pin 27 projecting through the inclined, or cam, slot 25. Rotatably mounted in the bushing 26 is a vertical spindle 28 carrying the tool 21 which ordinarily has a triangularly formed work point. The spindle is driven at high speed, in any desired manner, as by means of the pulley 29, the belt drive 30 and the motor 31. This manner of driving the spindle is old and well known in this art and forms no part of my present invention.

The inclined, or cam, slot 25 and the cooperating pin 27 carried by the bushing 26 passing therethrough, are utilized as a part of an actuating mechanism for moving the work head toward and from the work table 18, this movement resulting from the rotary movement of the bushing 26 and its downward component of movement resulting from the engagement of the pin 27 with the inclined, or cam, slot 25.

For the purpose of limiting the downward movement of the work head, but to a variable extent as determined by the work plate or sheet 19, I provide a stop member 32 having movement simultaneously with the work head, both in its movement toward and from the plate 19, said stop member projecting towards the tool 21 to a position adjacent and above the working point thereof, so that the depth of cut made by the tool will be limited by the engagement of the curved end 33 of said stop with the plate 19. This depth of cut will be determined by the distance between the extreme point of the tool 21 and the lower face of the stop.

Preferably, the stop member 32 throughout has a transversely curved surface presented towards the table 18 so as to minimize frictional engagement thereof with a plate, and reduce the area of contact in a manner to permit the stop to function with small irregularities in the plate or sheet, while permitting adjustment of stop towards or from the tool 21.

Since under some conditions it is desired to vary this depth of cut even in work done upon different parts of the same work plate or sheet, the stop member is so supported as to be adjustable vertically in relation to the tool 21.

In the form of the invention shown, said stop member 32 is mounted in a suitable block 34 carried by a slide 35 mounted in the tracks or slideways 24. Adjustment of the stop member 32 with relation to said guide is by means of ordinary set screws 36. Means securing finer adjustment of said stop member may be used if desired, but for the character of the work for which this machine is particularly designed, precision as to the depth of cut is not required, although uniformity as to such depth throughout different portions of the work is desirable. The plate 35 is retained in position in the tracks or slideways 24 by means of a face plate 37.

The slide 35 has a horizontal slot 38 therein, extending across the inclined or cam slot 25. The pin 27 projects through this slot, the length of the slot being such as to permit the desired rotative movement of the bushing 26, and impart to the slide 35 and the stop member 32 movement toward or from the table 18 simultaneously with, and to the same extent as, similar movements of the bushing 26 and the work head, therewith.

Acting upon the pin 27 and secured to an extension upon the plate 37 is a spring 39 having a normal tendency to impart movement to the bushing 26 in a direction which will move the work head away from the table 18. Also connected to said pin 27 is a strand 40 which extends parallel with the levers 14 and 15 passing about pulleys 41 and 42 idly mounted upon the pivots connecting the lever 15 with the lever 14, and the lever 14 with the forked arm 13 respectively. After passing around the pulley 42 said strand passes through an opening in the arm 13, and about the pulleys 43 and 44 to a pedal 45. By this construction of actuating mechanism, not only is freedom of oscillatory movement of the levers 14 and 15 permitted without any variation in the length of the strand 40, but since the stresses upon said strand for actuating the work head always are parallel to said levers respectively, a pull upon said strand will have no tendency to cause distortion in the reproduction.

At some point of the strand 40, I employ a spring 46 which will limit the stress applied to the pin 27 by the pedal 45, while at the same time permitting movement of said pin independently of said pedal.

The operation of the herein described machine is substantially as follows:—

A pattern upon the support 17 may be reproduced on any desired scale by the lever system 12 and tracing stylus 16, the levers 14 and 15 and the work point 21, the levers of the system 12 being relatively adjustable to secure the desired scale of reproduction.

With a plate of vulcanite, bakelite or other material upon the table 18, to cause the design to be cut thereon, power is applied to the spindle 28, and the pedal 45 depressed. This action of the pedal, through the strand 40 will act upon the pin 27 to turn the bushing 26 in the sleeve 23 against the tension of the spring 39. With this rotary movement of the bushing 26 and the pin 27, the bushing and the spindle 28 carried thereby, will receive a vertical component of movement as a result of the engagement of said pin 27 with the inclined or cam slot 25. The horizontal slot 38 in the slide 35 will permit the rotative movement of the pin 27, downward movement of the bushing 26 and of the pin 27, while imparting movement in the same direction and in the same degree, to said slide 35, and hence to the stop member 32—33. When the bearing end 33 of this stop member contacts with the plate or sheet 19, this downward movement will be automatically arrested, thus limiting the extent of penetration of the work tool 21 into said plate or sheet.

Since the end 33 of the member 32 is closely adjacent the work tool or point 21, it will engage the plate only when the point of the tool 21 has penetrated to the maximum extent to secure the desired depth of cut, since there can be no appreciable surface variations in the short distances between the points of engagement of the tool and the stop member. This limiting action is independent of the quantity of vertical movement of the bushing 26 to the extent that it results from the engagement of the stop member 33 with the work plate or sheet 19, which engagement may occur with a greater or less movement of said bushing according to the thickness of the plate or sheet 19 at the point where work is being done. If the plate or sheet be a few thousandths high at one point, and a few thousandths low at another point, in the first instance the bushing 26 will have less vertical movement, and in the latter instance, it will have greater vertical movement, these differences in the movement of the bushing and of the spindle 28 however, not in any way varying the depth of cut, since this is determined solely by the distance between the extreme point of the tool 21 and the lower engaging surface of the end 33 of the stop member 32.

In its movements over the work plate or sheet 19, the bushing 26 will rise and fall as the stop member 32 passes over portions of the plate or sheet 19 in accord with variations in the heights of different portions of the surface of said plate or sheet, the spring 39 and the opposed stress upon the strand 40, and its spring 46 imparting the rotative movement to the bushing 26 incidental to the vertical movements of said bushing. It is to be borne in mind that these surface variations in the plate or sheet 19, and the resultant movements of the bushing through the stop member 32, are measured by but a few thousandths of an inch, while the point is cutting, any greater variations being taken care of when bringing the tool 21 and the stop member 32 and 33 into engagement with the plate or sheet 19 by means of a strand 40.

With a high speed, sharp work tool 21, but little pressure is required, and with a very small vertical movement of the parts under the control of the stop member 32, the resistance, or absence of resistance, encountered by the stop member 32 due to surface variations in the plate or sheet 19 will cause the springs 39 or 46 to act upon the pin 27 to impart the necessary small rotative movement to the bushing 26.

It is to be noted that while the bushing 26 has a rotative movement and a vertical component of motion due to the inclined, or cam, slot 25, the slide 35 has only a vertical movement due to the horizontal slot 38 therein, but that the vertical movement of said slide will also be determined by the pitch of said inclined, or cam, slot 25, thus causing the tool 21 and the stop member 32 to have simultaneous, similar vertical movement, and to the same extent.

If it be desired to vary the depth of cut made by the tool 21, the set screws 36 are loosened, and the stop member 32 raised or lowered according to whether it is desired to increase or decrease the depth of cut. While the machine is in operation, however, said screws are tightened so as to avoid any movement of the stop member independently of the slide.

As heretofore pointed out, the strand 40 passes about pulleys upon and concentric with the pivot connecting the lever arm 15 with the lever arm 14, and said last named lever arm with the supporting bracket 13, thus causing the reaches of said strand adjacent the lever arms 14 and 15 to extend parallel therewith, and thus have no tendency whatever to impart movement thereto, or to the pantographic lever system 12, while at the same time permitting freedom of movement of both said lever arms, and avoiding the presence of slack in, or variation in the pressure developed through, said strand.

For convenience of expression, the term "work head" is herein used to designate the spindle 28 and the mechanisms carried thereby for supporting the tool 21. The term "actuating means" includes the bushing 26, pin 27, and the collar 23 with its inclined, or cam, slot 25, together with the means acting upon said pin for imparting rotative movement to the bushing.

While the mechanism for limiting the depth of cut is ordinarily considered as being embodied in the work head, in the present instance it is considered as an adjunct thereto.

It is not my intention to limit the invention to the precise details of construction shown in the drawings, particularly as the form of the invention illustrated shows its application to one well known type of engraving machine, and such details for adapting the invention to other types of machines might require changes in design, without departing from the spirit and scope of the invention.

Having described the invention, what I claim as new and desire to have protected by Letters Patent, is:—

1. An engraving machine embodying therein a pantographic lever system, a work head actuated thereby, a tracing stylus carried by said lever system, a pattern support in operative relation to said stylus, a work table in operative relation to said work head, a tool carried by said work head, means having a normal tendency to move said work head from, and maintain it out of, the operative relation to work upon said work table, means whereby said work head may be moved toward said work table, a stop member projecting towards said tool to a position closely adjacent and above the working point thereof, whereby downward movement of said work head will be arrested by engagement of said stop member with a plate or sheet upon said work table, and thus ensure uniformity in the depth of cut made by said tool irrespective of surface irregularities in a plate or sheet upon said work table and means operative upon said stop member and acted upon both by the means for moving the work head toward and the means for moving the work head from said work table whereby said work head and said stop member will be simultaneously actuated through the same mechanism and to the same extent.

2. An engraving machine embodying therein a pantographic lever system, a work head actuated thereby, a tracing stylus carried by said lever system, a pattern support in operative relation to said stylus, a work table in operative relation to said work head, a tool carried by said work head, means having a normal tendency to move said work head from, and maintain it out of, the operative relation to work upon said work table, means whereby said work head may be moved toward said work table, a stop member projecting towards said tool to a position closely adjacent and above the working point thereof, whereby downward movement of said work head will be arrested by engagement of said stop member with a plate or sheet upon said work table, and thus ensure uniformity in the depth of cut made by said tool irrespective of surface irregularities in a plate or sheet upon said work table, means operative upon said stop member and acted upon both by the means for moving the work head toward and from said work table whereby said work head and the means for moving the work head said stop member will be simultaneously actuated through the same mechanism and to the same extent, and means whereby said stop member may be adjusted vertically toward or from the working point of said work tool, to vary the depth of cut which may be made thereby.

3. An engraving machine embodying therein a pantographic lever system, a work head actuated thereby, a tracing stylus carried by said lever system, a pattern support in operative relation to said stylus, a work table in operative relation to said work head, a tool carried by said work head, a stop member projected toward said tool to a position closely adjacent and above the working point thereof, a movable support for said stop member adjacent said work head, means having a normal tendency to move said work head from, and maintain it out of, the operative relation to work upon said work table, and means whereby said work head may be forced toward a plate or sheet upon said table, or may be permitted to have movement away therefrom, said last named means co-operating with said support for said stop member whereby said stop member will receive similar simultaneous movement with said work head and arrest movement of said work head by engagement with a plate or sheet upon said work table and thus ensure uniformity in the depth of cut made by said tool irrespective of surface irregularities in a plate or sheet upon said table.

4. An engraving machine embodying therein a pantographic lever system, a work head actuated thereby, a tracing stylus carried by said lever system, a pattern support in operative relation to said stylus, a work table in operative relation to said work head, a tool carried by said work head, a stop member projected toward said tool to a position closely adjacent and above the working point thereof, a movable support for said stop member adjacent said work head, means having a normal tendency to move said work head from, and maintain it out of, the operative relation to work upon said work table, and means whereby said work head may be forced toward a plate or sheet upon said table, or may be permitted to have movement away therefrom, said last named means co-operating with said support for said stop member whereby said stop member will receive similar simultaneous movement with said work head and arrest movement of said work head by engagement with a plate or sheet upon said work table and thus ensure uniformity in the depth of cut made by said tool irrespective of surface irregularities in a plate or sheet upon said table, and means whereby said stop member may be adjusted vertically toward and from the working point of said work tool, to vary the depth of cut which may be made thereby.

5. An engraving machine embodying therein a pantographic lever system, a work head actuated thereby, a tracing stylus carried by said lever system, a pattern support in operative relation to said stylus, a work table in operative relation to said work head, a tool carried by said work head, a bearing sleeve having an inclined, or cam, slot therethrough, a bushing rotatably and slidably mounted in said sleeve and adapted to impart movement to said work head, a pin carried by said bushing and passing through said inclined, or cam, slot in said sleeve, means operative upon said pin to impart movement thereto in opposite directions, and a stop member movable with said work head and projecting towards said tool to a position adjacent and above the working point thereof, whereby downward movement of said work head will be arrested by engagement of said stop member with a plate or sheet upon said work table, and thus ensure uniformity in the depth of cut made by said tool irrespective of surface irregularities in a plate or sheet upon said work table.

6. An engraving machine embodying therein a pantographic lever system, a work head actuated thereby, a tracing stylus carried by said lever system, a pattern support in operative relation to said stylus, a work table in operative relation to said work head, a tool carried by said work head, a bearing sleeve having an inclined, or cam, slot therethrough, a bushing rotatably and slidably mounted in said sleeve and adapted to impart movement to said work head, a pin carried by said bushing and passing through said inclined, or cam, slot in said sleeve, means operative upon said pin to impart movement thereto in opposite directions, a plate slidably mounted upon said bearing sleeve having a straight slot therethrough through which said pin passes, and a stop member carried by said plate and projecting towards said tool to a position adjacent and above the working point thereof, whereby downward movement of said work head will be arrested by engagement of said stop member with a plate or sheet upon said work table, and thus ensure uniformity in the depth of cut made by said tool irrespective of surface irregularities in a plate or sheet upon said work table.

7. An engraving machine embodying therein a pantographic lever system, a work head actuated thereby, a tracing stylus carried by said lever system, a pattern support in operative relation to said stylus, a work table in operative relation to said work head, a tool carried by said work head, a bearing sleeve having an inclined, or cam, slot therethrough, a bushing rotatably and slidably mounted in said sleeve and adapted to impart movement to said work head, a pin carried by said bushing and passing through said inclined, or cam, slot in said sleeve, means operative upon said pin to impart movement thereto in opposite directions, a stop member movable with said work head and projecting towards said tool to a position adjacent and above the working point thereof, whereby downward movement of said work head will be arrested by engagement of said stop member with a plate or sheet upon said work table, and thus ensure uniformity in the depth of cut made by said tool irrespective of surface irregularities in a plate or sheet upon said work table, and means whereby said stop member may be adjusted vertically toward or from the working point of said work tool, to vary the depth of cut which may be made thereby.

8. An engraving machine embodying therein a pantographic lever system, a work head actuated thereby, a tracing stylus carried by said lever system, a pattern support in operative relation to said stylus, a work table in operative relation to said work head, a tool carried by said work head, a bearing sleeve having an inclined, or cam, slot therethrough, a bushing rotatably and slidably mounted in said sleeve and adapted to impart movement to said work head, a pin carried by said bushing and passing through said inclined, or cam, slot in said sleeve, means operative upon said pin to impart movement thereto in opposite directions, a plate slidably mounted upon said bearing sleeve having a straight slot therethrough through which said pin passes, a stop member carried by said plate and projecting towards said tool to a position adjacent and above the working point thereof, whereby downward movement of said work head will be arrested by engagement of said stop member with a plate or sheet upon said work table, and thus ensure uniformity in the depth of cut made by said tool irrespective of surface irregularities in a plate or sheet upon said work table, and means whereby said stop member may be adjusted vertically of said plate toward or from said work tool to vary the depth of cut which may be made thereby.

9. An engraving machine embodying therein a pantographic lever system, a work head actuated thereby, a tracing stylus carried by said lever system, a pattern support in operative relation to said stylus, a work table in operative relation to said work head, a tool carried by said work head, a bearing sleeve having an inclined, or cam, slot therethrough, a bushing rotatably and slidably mounted in said sleeve and adapted to impart movement to said work head, a pin carried by said bushing and passing through said inclined, or cam, slot in said sleeve, a stop member movable with said work head and projecting towards said tool to a position adjacent and above the working point thereof, whereby downward movement of said work head will be arrested by engagement of said stop member with a plate or sheet upon said work table, and thus ensure uniformity in the depth of cut made by said tool irrespective of surface irregularities in a plate or sheet upon said work table, a strand having a spring in the length thereof connected with said pin, and a spring acting upon said pin in opposition to said strand, whereby said work head may be moved toward or from a plate or sheet upon the table by means of said strand, and have movement under the control of said stop member independently of said strand.

10. An engraving machine embodying therein a pantographic lever system, a work head actuated thereby, a tracing stylus carried by said lever system, a pattern support in operative relation to said stylus, a work table in operative relation to said work head, a tool carried by said work head, a bearing sleeve having an inclined, or cam, slot therethrough, a bushing rotatably and slidably mounted in said sleeve and adapted to impart movement to said work head, a pin carried by said bushing and passing through said inclined, or cam, slot in said sleeve, a stop member movable with said work head and projecting towards said tool to a position adjacent and above the working point thereof, whereby downward movement of said work head will be arrested by engagement of said stop member with a plate or sheet upon said work table, and thus ensure uniformity in the depth of cut made by said tool irrespective of surface irregularities in a plate or sheet upon said work table, a strand having a spring in the length thereof connected with said pin, a spring acting upon said pin in opposition to said strand, whereby said work head may be moved toward or from a plate or sheet upon the table by means of said strand, and have movement under the control of said stop member independently of said strand, and means whereby said stop member may be adjusted vertically toward or from the working point of said work tool, to vary the depth of cut which may be made thereby.

11. An engraving machine embodying therein a pantographic lever system, a work head actuated thereby, a tracing stylus carried by said lever system, a pattern support in operative relation to said stylus, a work table in operative relation to said work head, a tool carried by said work head, a bearing sleeve having an inclined, or cam, slot therethrough, a bushing rotatably and slidably mounted in said sleeve and adapted to impart movement to said work head, a pin carried by said bushing and passing through said inclined, or cam, slot in said sleeve, a plate slidably mounted upon said bearing sleeve having a straight slot therethrough through which said pin passes, a stop member carried by said plate and projecting towards said tool to a position adjacent and above the working point thereof, whereby downward movement of said work head will be arrested by engagement of said stop member with a plate or sheet upon said work table, and thus ensure uniformity in the depth of cut made by said tool irrespective of surface irregularities in a plate or sheet upon said work table, means whereby said stop member may be adjusted vertically of said plate toward or from said work tool to vary the depth of cut which may be made thereby, a strand having a spring in the length thereof connected with said pin, and a spring acting upon said pin in opposition to said strand, whereby said work head may be moved toward or from a plate or sheet upon the table by means of said strand, and have movement under the control of said stop member independently of said strand.

12. An engraving machine embodying therein a fixed support, a lever pivoted thereto to have movement laterally of the machine, a second lever pivoted to said first named lever to have oscillatory movement fore and aft of the machine, a pantographic lever system operative upon said last named lever, an inclined, or cam, slot therethrough carried by said last named lever, a stylus carried by said lever system, a pattern support in operative relation to said stylus, a work table, a bearing sleeve having a bushing rotatably and slidably mounted therein, a work head adapted to receive movement from said bushing towards and from said table, a work tool carried by said head, a pin carried by said bushing and passing through said inclined, or cam, slot in said sleeve, a stop member movable with said work head and projected towards said tool to a position adjacent and above the working point thereof, whereby downward movement of said work head will be arrested by engagement of said stop member with a plate or sheet upon said work table and thus ensure uniformity in the depth of cut made by said tool irrespective of surface irregularities in a plate or sheet upon said work table, a manually operative member, pulleys concentric with the pivotal connection between the lever carrying said sleeve, and the lever connected with said fixed support, and between said support and the manually operative member, a flexible strand connected with said pin and passing about said pulleys to said manually operative member, whereby the direction of stresses applied through said strand will be parallel with said levers respectively, and a spring acting upon said pin in opposition to said strand, whereby said work head may be moved toward or from a plate or sheet upon said table by means of said strand, and have movement under the control of said stop member independently of said strand.

In witness whereof I have hereunto affixed my signature this 16th day of October, 1924.

WILLIAM J. DONOVAN.